Sept. 17, 1940.   W. P. OVERBECK   2,214,773
FILTER SYSTEM FOR CONTROLLED RECTIFIERS
Original Filed Jan. 22, 1938   3 Sheets-Sheet 1
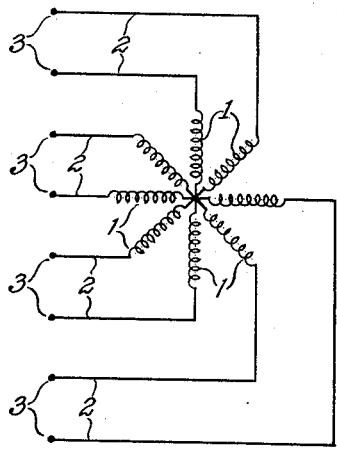
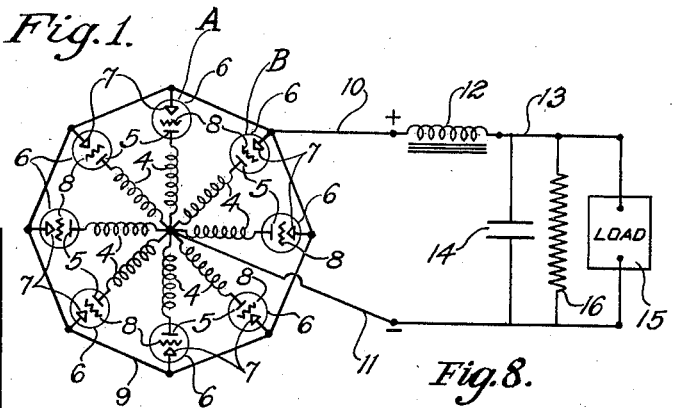
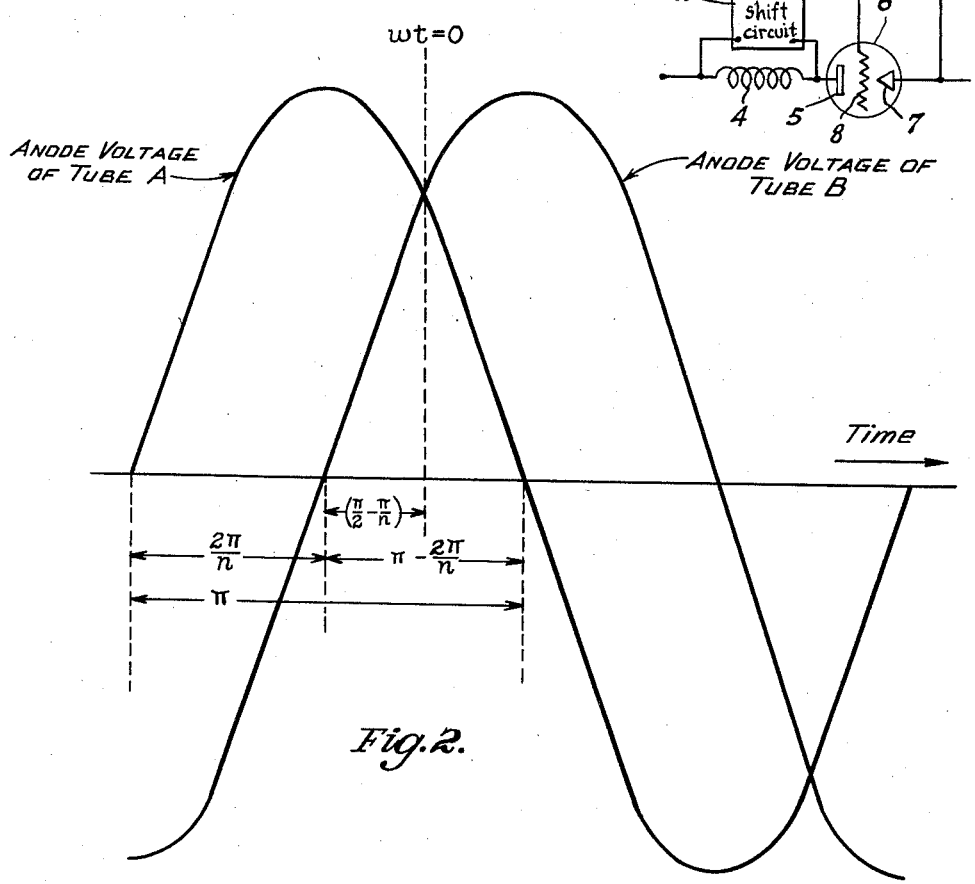
Inventor
WILCOX P. OVERBECK
by Elmer J. Gorn.
Attorney Inventor
WILCOX P. OVERBECK
by Elmer J. Gorn
Attorney Patented Sept. 17, 1940

2,214,773

UNITED STATES PATENT OFFICE 2,214,773

FILTER SYSTEM FOR CONTROLLED RECTIFIERS

Wilcox P. Overbeck, Waltham, Mass., assignor to Raytheon Manufacturing Company, Newton, Mass., a corporation of Delaware Application January 22, 1938, Serial No. 186,372
Renewed December 15, 1939

10 Claims. (Cl. 175—363)

This invention relates to filter systems for single-phase or multi-phase rectifiers employing gas or vapor-filled tubes of the grid-controlled or magnetically-controlled type.

One of the major objections to the use of tubes of this type for controlling alternating current power is that since the control is obtained by varying the time during the cycle when conduction starts, the current passing through the tube has a highly peaked wave form, particularly when starting very late in the cycle. Such currents induce high losses in associated transformers and power lines, and thus prevent the user from obtaining good utility of these transformers, and also are objected to by the power companies. Another difficulty often encountered in such rectifier systems is instability or discontinuity of control when a filter is employed. A third problem is that of obtaining stable output voltages whose values may be adjusted as low or lower than the voltage drop through the rectifier tubes themselves. Two other desirable factors in this problem of controlled rectifiers are the balancing of currents between the tubes and the obtaining of good regulation with varying load.

One of the objects of my invention is to provide a construction of the filter which improves the wave form of the alternating current input to the system.

Another object is to provide such a filter in which the instability and discontinuity heretofore encountered are eliminated.

An additional object is to provide a controlled rectifier system in which the output voltages may be adjusted to values of the order of the voltage drop through the rectifier tubes or less.

A still further object is to provide a filter with a critical value of input inductance whereby the foregoing objects are accomplished.

The foregoing and other objects of my invention will be best understood from the following description of exemplifications thereof, reference being had to the accompanying drawings, wherein:

Fig. 1 is a diagrammatic representation of a multi-phase controlled rectifier system incorporating my invention;

Fig. 2 illustrates a portion of the voltages applied to two anodes conducting one directly after the other in the system shown in Fig. 1;

Fig. 8 is a diagrammatic representation of a phase shift circuit, as applied to Fig. 1.

Figure 3:
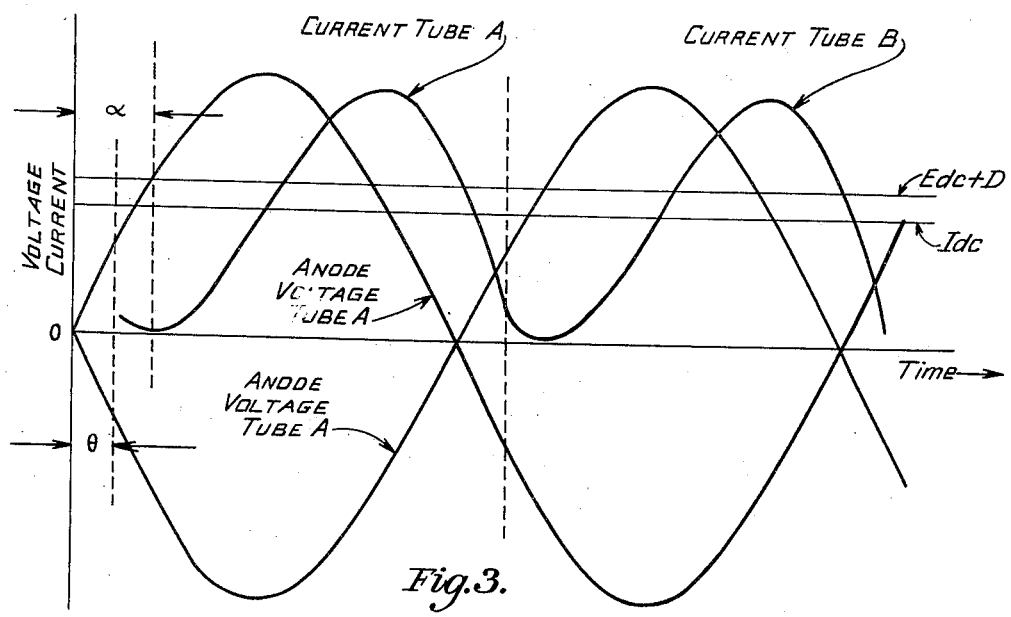
Figs. 3 and 4 are illustrations of voltages and currents in a single-phase, full-wave rectifier embodying my invention.

In Fig. 1 there is illustrated a system in which are provided primary windings 1 of a multi-phase transformer. These windings are connected together at one end. The opposite end of each of the coils 1 is connected by means of a conductor 2 to a terminal 3. The terminals 3 may be connected to some suitable source of multi-phase alternating current. The transformer is also provided with a plurality of secondary coils 4 likewise connected together at one end. The outer end of each coil 4 is connected to an anode 5 of a controlled rectifier 6. Each rectifier 6 is provided with a cathode 7, preferably of the type which is heated to temperature of thermionic emission by means of some suitable electrical heater. Each tube 6 is filled with a suitable ionizing gas or vapor so that upon the passage of a discharge between each cathode 7 and anode 5, the gas or vapor becomes highly ionized and current flows at a relatively low voltage drop. In order to control the initiation of current between each cathode 7 and anode 5, there is interposed a control grid 8. In tubes of this kind, if a negative voltage is impressed upon the control grid 8 when the anode 7 becomes positive, starting of the current between the cathode and anode will be delayed until the voltage on the control grid 8 falls to a predetermined minimum value, which may be substantially zero. In order to produce this delay, the control voltage may be impressed upon the grid 8 through a suitable phase-shift circuit 17, as indicated diagrammatically in Fig. 8. Instead of using the control grid 8, any other type of control means, whereby the time at which the discharge can start, may be utilized. For example, a magnetic control of the type as described and claimed in the co-pending application of Percy L. Spencer, Serial No. 612,235, filed May 19, 1932, entitled Electrical gaseous discharge device, may be used.

All of the cathodes 7 are connected together by means of a common conductor 9 which constitutes the positive terminal of the rectifier system to which the positive lead 10 is connected. The common connection for the inner ends of the coils 4 constitutes the negative terminal of this system. To this common point is connected the negative lead 11. In series with the positive lead 10 is connected an inductive choke whose value must be greater than a critical value, as will be described hereinafter. A conductor 13 is connected to the outer end of the choke 12. A condenser 14 is connected between the conductors 11 and 13. The codenser 14 and choke 12 constitute a filter system which eliminates the ripples introduced by the individual rectifier tubes, and maintains the voltage at the terminals of the condenser 14 at a constant value. It is to be understood that any other filter network may be used provided it has an input choke such as that illustrated at 12. The output from the filter is connected to any suitable load 15. In order to prevent the resistance connected across the output of the filter from increasing beyond a predetermined value, a bleeder resistance 16 is permanently connected thereto.

In order to analyze the system shown in Fig. 1, we may take any two adjacent tubes indicated at A and B in Fig. 1, and consider the operation thereof in connection with Fig. 2. In Fig. 2 is illustrated the anode voltage applied to the tube A and the anode voltage applied to the tube B, lagging the voltage of tube A by a phase angle $$\frac{2\pi}{n}$$

where $n$ represents the number of phases in the rectifying system. Since in Fig. 1 eight phases are illustrated, the actual phase displacement between the two voltages of Fig. 2 is equal to $$\frac{\pi}{4}$$

or 45 degrees. However, the analysis herein given is independent of the actual number of phases in the rectifying system, and therefore the phase displacements indicated in Fig. 2 are given in general terms of the number of phases. We may consider that $\omega t$, the time, is zero at the normal instant of firing of tube B. This occurs at the intersection of the two voltage waves. Under these conditions the anode voltage of tube B may be expressed as $$e = E_{max} \sin\left(\omega t + \frac{\pi}{2} - \frac{\pi}{n}\right) \quad \text{(Equation 1)}$$

where $e$=instantaneous value of anode voltage at time $t$,
$E_{max}$=peak value of anode voltage,
$\omega = 2\pi$ times line frequency,
$n$=number of phases of rectification.

By the number of phases is meant the number of separate controlled rectifier paths which are provided and which conduct current in sequence. Thus, for example, in an ordinary single-phase, full-wave rectifying system having two rectifying tubes, two rectifying paths are provided, and thus $n=2$. In the specification and claims, therefore, whenever the term "plural phase" or "plurality of rectifying phases" or the like is used, this indicates a plurality of separate controlled discharge paths as described above.

If under the conditions illustrated in Fig. 2 a control is employed, for example, by means of the control grids 8 so that all the rectifying paths in the system are delayed in firing by an angle $\theta$ and each tube continues to conduct until the next one starts, the resultant direct current output voltage will be $$E_{dc} = \frac{n}{\pi} E_{max} \cos \theta \sin \frac{\pi}{n} - D \quad \text{(Equation 2)}$$

where $D$ is the voltage drop through the tubes. This value $D$ is substantially constant in the usual type of gas-filled tube.

If, as specified above, the condenser 4 is of sufficient magnitude to maintain substantially constant output voltage, Equation 2 gives the potential across the condenser 14, the bleeder resistance 16 or the load 15.

During the period of conduction of tube B, its cathode potential and consequently the potential between the conductors 10 and 11 will be $$e_r = E_{max} \sin\left(\omega t + \frac{\pi}{2} - \frac{\pi}{n}\right) - D \quad \text{(Equation 3)}$$

The voltage across the choke 12, therefore, is the difference between the voltage as given in Equation 3 and the voltage as given in Equation 2, or $$e_c = E_{max}\left[\sin\left(\omega t + \frac{\pi}{2} - \frac{\pi}{n}\right) - \frac{n}{\pi}\cos\theta \sin\frac{\pi}{n}\right] \quad \text{(Eq. 4)}$$

It is to be understood that this relation applies only during the period of conduction of a single tube, and is repeated as each successive tube fires.

The current through the input choke 12 is given by the following relation for the same period $$i_c = \frac{E_{max}}{\omega L}\left[-\cos\left(\omega t + \frac{\pi}{2} - \frac{\pi}{n}\right) - \frac{n\omega t}{\pi}\cos\theta \sin\frac{\pi}{n} + C\right] \quad \text{(Eq. 5)}$$

where $L$ is the inductance of the choke 12 and $C$ is a constant whose value is to be determined.

In such a rectifier system as that illustrated in Fig. 1, if the inductance of the input choke 12 is zero or very small, each tube will conduct only for a very short period of time, and if the inductance is increased, a critical value is finally reached at which conduction is obtained over the full $1/n$th of a cycle. If the inductance is exactly the critical value, the current as given by Equation 5 is equal to zero at some instant ($\omega t = \alpha$) during the period of conduction. If we set $\omega t = \alpha$ and $i_c = 0$, we can obtain an expression for C as follows:

$$C = \cos\left(\alpha + \frac{\pi}{2} - \frac{\pi}{n}\right) + \frac{n\alpha}{\pi}\cos\theta \sin\frac{\pi}{n} \quad \text{(Eq. 6)}$$

If this value were substituted in Equation 5 and the average value of the current wave is made equal to the average direct current which is substantially the situation occurring in practice, the following relation is obtained:

$$I_{dc} = \frac{1}{\omega L_c}\frac{n}{\pi}E_{max}\cos\theta\sin\frac{\pi}{n}$$

$$\left[\tan\theta - \theta - \frac{\pi}{n} + \frac{\pi C}{n\cos\theta \sin\frac{\pi}{n}}\right] \quad \text{(Eq. 7)}$$

where $L_c$=critical value of inductance,
$I_{dc}$=D. C. output current through the load, including the load 15 and the bleeder resistor 16.

Since $$\frac{n}{\pi}E_{max}\cos\theta\sin\frac{\pi}{n} = E_{dc} + D$$

$$\frac{I_{dc}\omega L_c}{E_{dc}+D} = \tan\theta - \theta - \frac{\pi}{n} + \alpha + \frac{\pi\cos\left(\alpha + \frac{\pi}{2} - \frac{\pi}{n}\right)}{n\cos\theta\sin\frac{\pi}{n}}$$

Since $E_{dc}/I_{dc} = R$ (the total load resistance, 15 and 16 in parallel)

$$\frac{\omega L_c}{R} = \left(1 + \frac{D}{E_{dc}}\right)$$

$$\left[\tan\theta - \theta - \frac{\pi}{n} + \alpha + \frac{\pi\cos\left(\alpha + \frac{\pi}{2} - \frac{\pi}{n}\right)}{n\cos\theta\sin\frac{\pi}{n}}\right] \quad \text{(Eq. 8)}$$

Figure 4:
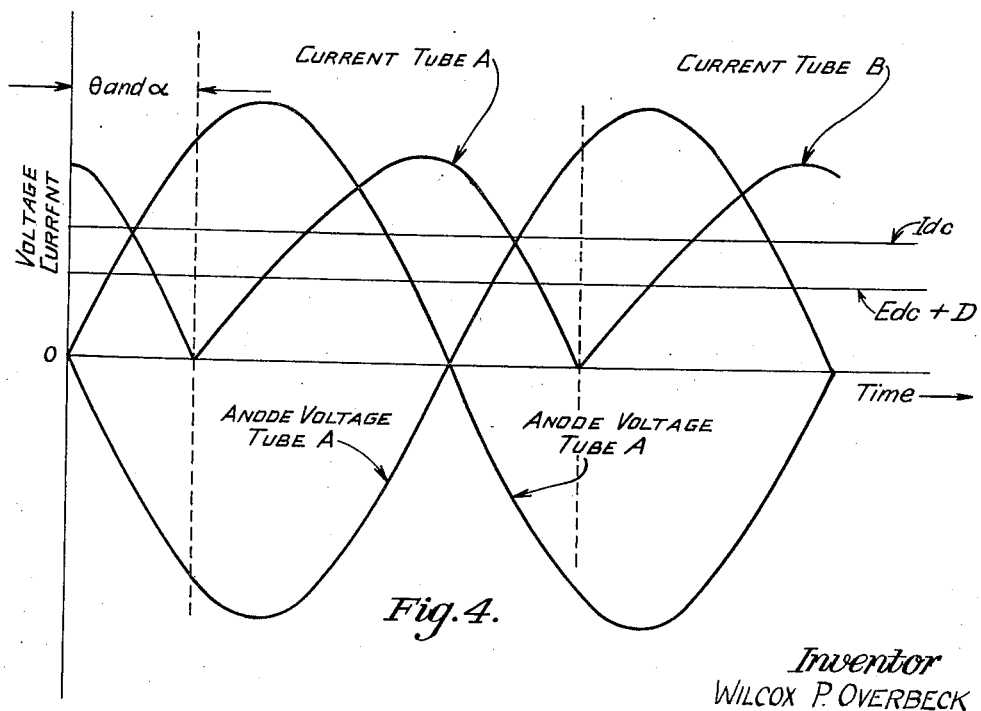

I determine the only indeterminate factor $\alpha$ from my knowledge that the instant at which current is just equal to zero must correspond to the instant at which the choke voltage $e_c$ is equal to zero because it represents also a point at which $$\frac{di}{dt}$$

is zero. Figs. 3 and 4 illustrate this point. For simplicity's sake, these figures are drawn to represent the conditions in a single phase full-wave rectifier or a rectifying system in which $n=2$, that is, a rectifying system having two controlled rectifying paths. In connection with Figs. 3 and 4, the two rectifying tubes of the system are again considered as being tubes A and B. These figures show the voltage applied to each tube, the current flowing through each tube, the resultant direct current, and the resultant D. C. output voltage to which has been added the tube drop. In each of these figures the phase angle at which each tube starts to conduct current is represented by the symbol $\theta$ in conformity with the analysis given above.

In Fig. 3 there is shown the conditions in which each tube starts to conduct current before the anode voltage becomes equal to the direct current output voltage plus the tube drop. Under the foregoing conditions, the current drops to zero at the instant when the anode voltage is equal to the output voltage plus the tube drop, or when $$\omega t = \frac{\pi}{n} - \frac{\pi}{2} + \sin^{-1}\left\{\frac{n}{\pi}\cos\theta\sin\frac{\pi}{n}\right\} \quad \text{(Equation 9)}$$

In Fig. 4 the starting of current through each tube is delayed to a later part of the cycle than that shown in Fig. 3. This delay is such that each tube starts to conduct current after the anode voltage has become equal to the direct current output voltage plus the tube drop. Under these conditions, both $\theta$ and $\alpha$ have the same value. Also under these conditions the current is zero at the instant of firing or when $$\omega t = \theta \quad \text{(Equation 10)}$$

These values of $\omega t$ in Equations 9 and 10 are actually equal to $\alpha$ for the respective conditions given.

The two conditions illustrated in Figs. 3 and 4 represent the two general types of operation which may occur. However, there is a border line condition lying exactly between these two cases which occurs when each tube fires at such an instant that the resultant direct current output plus the tube drop is equal to the anode voltage at the instant of firing, or when $$\theta = \tan^{-1}\left(\frac{n}{\pi} - \cot\frac{\pi}{n}\right) \quad \text{(Equation 11)}$$

The foregoing analysis is given for the purpose of enabling those utilizing my invention to apply the results thereof to any given case more effectively. The results which may be obtained from my analysis may be expressed as follows:

$$\frac{\omega L c}{R} = \left(1 + \frac{D}{E_{dc}}\right)$$

$$\left[\tan\theta - \theta - \frac{\pi}{n} + \frac{\alpha + \pi\cos\left(\alpha + \frac{\pi}{2} - \frac{\pi}{n}\right)}{n\cos\theta\sin\frac{\pi}{n}}\right] \quad \text{(Eq. 12)}$$

where $$\alpha = \frac{\pi}{n} - \frac{\pi}{2} + \sin^{-1}\left(\frac{n}{\pi}\cos\theta\sin\frac{\pi}{n}\right)$$

for values of $\theta$ between zero and $$\tan^{-1}\left(\frac{n}{\pi} - \cot\frac{\pi}{n}\right)$$

For values of $\theta$ greater than $$\tan^{-1}\left[\frac{n}{\pi} - \cot\frac{\pi}{n}\right], \alpha = \theta$$

and, $$\frac{\omega L c}{R} = \left(1 + \frac{D}{E_{dc}}\right)\tan\theta\left(1 - \frac{\pi}{n}\cot\frac{\pi}{n}\right) \quad \text{(Eq. 13)}$$

Figure 5:
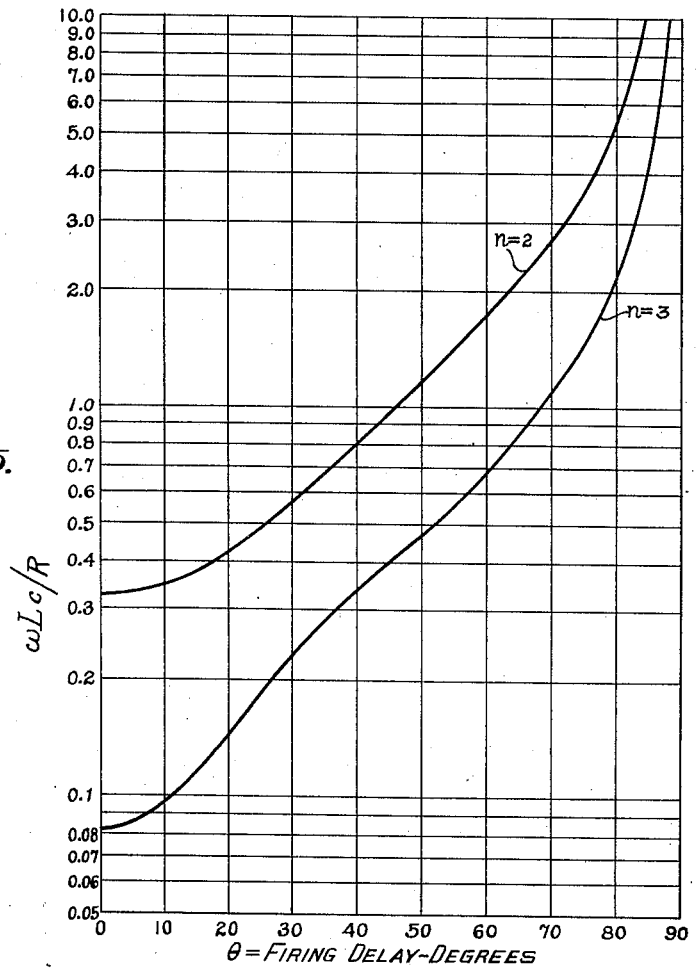
Fig. 5 is a chart for determining the critical value of input choke inductance.

An investigation of Equations 12 and 13 shows that from these equations the critical value of inductance for any given condition may be determined. However, the use of Equations 12 and 13 is greatly facilitated if the curves which they represent are actually plotted. In Fig. 5 I have plotted two curves giving values of $$\frac{\omega L c}{R}$$

as a function of $\theta$, the angle at which firing of each tube occurs. The curve labeled $n=2$ represents values obtained in a system having two controlled rectifying paths, and the curve $n=3$ represents values obtained in a system having three controlled rectifying paths. For higher values of $n$, similar curves may readily be plotted from Equations 12 and 13. Throughout the specification and claims, when a critical value of inductance is referred to, I mean a value of inductance which satisfies the Equations 12 and 13.

Figure 6:
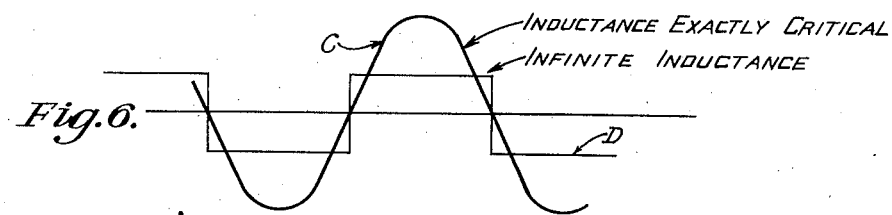
Fig. 6 illustrates the input current wave form at low values of output voltage, with a system incoporating a critical value of input inductance in accordance with my invention.
Figure 7:
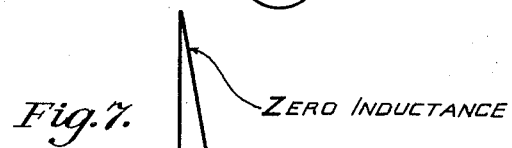
Fig. 7 illustrates the input current wave form under similar conditions in a system having a zero inductance input to the filter.

If a controlled rectifying system such as I have disclosed is constructed with an input choke 12 which is of critical value or greater for all values of load and firing angle, greatly improved operation is obtained over that which has existed in similar systems heretofore. One of the results obtained is that the input current wave form will be greatly improved particularly at low values of output voltage. If a single-phase, full-wave controlled rectifier is constructed without any input choke or inductance such as I have illustrated at 12 in Fig. 1, and the firing of the tubes is delayed so as to produce a low output voltage, conduction of current will occur through only a small fraction of each cycle and the input current will have the peaked form as shown in Fig. 7. This wave form has all of the disadvantages as heretofore pointed out. If, however, under the same conditions as shown in Fig. 7, an input choke such as 12 is added to the system and said choke is given exactly the critical value, the input current wave will be substantially a sine wave as illustrated at C in Fig. 6. As the inductance of the input choke is increased, the input wave form gradually deviates from that shown at C in Fig. 6 until at an infinite value of inductance the input wave form would become that represented at D in Fig. 6. From the foregoing it will be seen that values of filter input inductance which are equal to the critical value or slightly greater give an input current wave form which very closely approximates a sine wave, and therefore eliminates to a substantial degree the disadvantage of the peaked input wave form as illustrated in Fig. 7.

If we investigate Figs. 3 and 4, we see that as long as one tube conducts current until the other tube starts, the anode voltage applied to the second tube just prior to starting is the sum of the magnitudes of the two anode voltages at that instant. This is a condition which occurs only if the filter input choke has an inductance greater than the critical value. If, however, the inductance is less than critical, one tube will stop conducting before the next tube starts, and the anode voltage applied to the second tube just prior to starting is only equal to the anode voltage wave applied to that tube minus the D. C. output voltage. Therefore, if the inductance is not designed to be of a critical value for all required values of load or firing delay, a discontinuity in control occurs when an attempt is made to control the rectifier through a firing angle at which the inductance becomes less than the critical value. This discontinuity is due to the fact that when the inductance becomes less than critical, the anode voltage prior to firing is suddenly reduced from the sum of the two anode voltages at the firing instant to the anode voltage of the single wave applied to the tube which it is desired to start minus the D. C. output voltage. An investigation of Fig. 5 will show that as the firing delay increases, the requisite value of critical inductance rises very rapidly. Thus in the prior art where no attempt has been made to select a critical value of inductance, inevitably the value that was selected was less than the critical value for any substantial firing delay.

One of the difficulties heretofore encountered with controlled rectifiers has been that the regulation of the output voltage as the load changed was very poor. This was due to the fact that with inductances of less than critical value, each tube ceased to conduct current before the succeeding tube started. Thus for a certain definite period, no current was flowing, and in effect the D. C. system was disconnected from the supply of power fed from the alternating current supply. Under these conditions the maintenance of the voltage on the direct current system was dependent upon the ability of the condenser 14 to supply such a voltage. Of course even with an infinite condenser, an absolute maintenance of the voltage on the direct current system under these conditions is impossible, and therefore when this condition occurred, there would be an uncontrollable variation in the output voltage. When, however, a critical inductance or greater is used, current flows continuously through the choke and the tubes, and therefore the condenser 14 is no longer called upon to supply exclusively the voltage of the direct current system during any portion of the operation. The result, therefore, is that when a critical inductance is used, a decided improvement in the regulation of the output voltage with load is obtained.

The use of the critical inductance also insures consistent starting of current through each of the tubes, and thus helps to balance the current flow through the individual tubes. This is due to the fact, as pointed out above, that with a critical inductance, a starting voltage is impressed upon each tube which is considerably higher than that which is impressed on the tube with an inductance less than critical.

By the use of a system having a critical inductance, it is possible to secure consistent operation when the magnitude of the output voltage is adjusted to values of the order of magnitude of the tube drop and to even less. Thus adjustments of the output voltage down to values very close to zero are obtainable with my system. In the arrangement which I have shown, such low voltages are obtained when the firing delay is close to 90 degrees, in which case the voltage applied to the anode of each tube just prior to starting may be extremely large compared to the resulting direct current output voltage. In prior systems which do not utilize a critical inductance, low values of output voltage can only be obtainable with firing delay close to 180 degrees, under which conditions a very low anode voltage is applied to each tube prior to starting, and where such anode voltage drops below the consistent starting voltage of the tube, operation either ceases entirely or instability and unsatisfactory behaviour result.

Due to the fact that the sum of the two anode voltages at the instant of firing is impressed upon each tube in my system, it is also possible to use alternating voltages of very low values. For example, it is possible to use an alternating input voltage in each phase whose peak value is of the order of the minimum firing voltage of each rectifier tube or even less. However, in each case the total voltage applied to each anode should be greater than the minimum firing voltage. In order that this be true in any case, the peak voltage supplied to each rectifying phase from the alternating current source should be greater than half of the minimum firing voltage for each tube. With prior art devices using less than critical inductance, satisfactory operation could not be obtained unless and until the peak value of the voltage of each alternating phase was considerably in excess of the minimum firing voltage of each rectifying path.

The invention has been described above in general terms and has been analyzed in connection with the general case. It will be realized, therefore, that my invention is capable of wide and general application. Many variations and applications of the principles of my invention will readily present themselves to those skilled in the art. It is accordingly desired that the appended claims be given a broad interpretation commensurate with the scope of the invention within the art.

What is claimed is:

1. A controlled rectifier system comprising a plurality of rectifying phases each adapted to be supplied with current from an alternating current source, an electrical space discharge rectifier in each of said phases, control means for delaying the starting of current in each of said rectifiers for a substantial phase angle beyond the normal firing angle, a direct current load connected to the output of said rectifiers, a filter interposed between said rectifiers and said load circuit, said filter including an input choke, said load having a predetermined normal maximum value of resistance, said input choke having a value equal to or greater than the critical value at which current will flow through each rectifier until the succeeding rectifier starts to conduct current at substantially said delayed phase angle and substantially said normal maximum load resistance.

2. A controlled rectifier system comprising a plurality of rectifying phases each adapted to be supplied with current from an alternating current source, an electrical space discharge rectifier in each of said phases, control means for delaying the starting of current in each of said rectifiers for a substantial phase angle beyond the normal firing angle, a direct current load connected to the output of said rectifiers, a filter interposed between said rectifiers and said load circuit, said filter including an input choke, a bleeder resistance having a predetermined value permanently connected across said load circuit, said input choke having a value equal to or greater than the critical value at which current will flow through each rectifier until the succeeding rectifier starts to conduct current at substantially said delay phase angle with substantially zero load.

3. A controlled rectifier system comprising a plurality of rectifying phases each adapted to be supplied with current from an alternating current source, an electrical space discharge rectifier in each of said phases, the peak value of the alternating current supplied to each rectifying phase being of the order of magnitude of the minimum firing voltage of the rectifier in said phase or less, control means for delaying the starting of current in each of said rectifiers for a substantial phase angle beyond the normal firing angle, a direct current load connected to the output of said rectifiers, a filter interposed between said rectifiers and said load circuit, said filter including an input choke, said load having a predetermined normal maximum value of resistance, said input choke having a value equal to or greater than the critical value at which current will flow through each rectifier until the succeeding rectifier starts to conduct current at substantially said delayed phase angle and said normal maximum load resistance.

4. A controlled rectifier system comprising a plurality of rectifying phases each adapted to be supplied with current from an alternating current source, an electrical space discharge rectifier in each of said phases, a direct current load connected to the output of said rectifiers, control means for delaying the starting of current in each of said rectifiers for a substantial phase angle beyond the normal firing angle for controlling the magnitude of the voltage supplied to said load, the minimum value which the load voltage may be reduced by said control means being of the order of magnitude of the voltage drop through each rectifier during conduction of current or less, a filter interposed between said rectifiers and said load circuit, said filter including an input choke, said load having a predetermined normal maximum value of resistance, said input choke having a value equal to or greater than the critical value at which current will flow through each rectifier until the succeeding rectifier starts to conduct current at substantially said delayed angle and said normal maximum load resistance.

5. A controlled rectifier system comprising a plurality of rectifying phases each adapted to be supplied with current from an alternating current source, an electrical space discharge rectifier in each of said phases, the peak value of the alternating current supplied to each rectifying phase being of the order of magnitude and more than one-half of the minimum firing voltage of the rectifier in said phase or less, control means for delaying the starting of current in each of said rectifiers for a substantial phase angle beyond the normal firing angle, a direct current load connected to the output of said rectifiers, and a filter interposed between said rectifiers and said load circuit, said filter including an input choke, said load having a predetermined normal maximum value of resistance, said input choke having a value equal to or greater than the critical value at which current will flow through each rectifier until the succeeding rectifier starts to conduct current at substantially said delayed phase angle and said normal maximum load resistance.

6. A controlled rectifier system comprising a plurality of rectifying phases each adapted to be supplied with current from an alternating current source, an electrical space discharge rectifier in each of said phases, control means for delaying the starting of current in each of said rectifiers for a substantial phase angle beyond the normal firing angle, an output circuit connected to the output of said rectifiers, an inductance in series with said circuit, said circuit having a predetermined normal maximum value of resistance, said inductance having a value equal to or greater than the critical value at which current will flow through each rectifier substantially until the succeeding rectifier starts to conduct current at substantially said delayed phase angle and said normal maximum load resistance.

7. A rectifier system comprising a plurality of rectifying phases each adapted to be supplied with current from an alternating current source, an electrical space discharge rectifier in each of said phases, each of said rectifiers being constructed to delay the starting of current therein for a substantial phase angle beyond the starting of the rectifying half of the voltage wave impressed on said rectifier, an output circuit connected to the output of said rectifiers, an inductance in series with said circuit, said circuit having a predetermined normal maximum value of resistance, said inductance having a value in henries equal to or greater than $$L_c = \frac{R}{\omega} \left\{ \left(1 + \frac{D}{E_{dc}}\right) \left[ \tan\theta - \theta - \frac{\pi}{n} + \alpha + \frac{\pi \cos\left(\alpha + \frac{\pi}{2} - \frac{\pi}{n}\right)}{n \cos\theta \sin\frac{\pi}{n}} \right] \right\}$$

where $R$ = total normal maximum resistance of said circuit,
$\omega = 2\pi$ times the line frequency,
$D$ = voltage drop in the tubes,
$E_{dc}$ = direct current output voltage,
$\theta$ = said phase angle of firing delay,
$n$ = number of phases of rectification, $$\alpha = \frac{\pi}{n} - \frac{\pi}{2} + \sin^{-1}\left(\frac{n}{\pi} \cos\theta \sin\frac{\pi}{n}\right)$$

for values of $\theta$ between 0 and $$\tan^{-1}\left[\frac{n}{\pi} - \cot\frac{\pi}{n}\right]$$

and $$L_c = \frac{R}{\omega}\left\{\left(1 + \frac{D}{E_{dc}}\right)\left[\tan\theta\left(1 - \frac{\pi}{n}\cot\frac{\pi}{n}\right)\right]\right\}$$

for values of $\theta$ greater than $$\tan^{-1}\left[\frac{n}{\pi} - \cot\frac{\pi}{n}\right]$$

8. A rectifier system according to claim 7 in which the peak value of the alternating current supplied to each rectifying phase is of the order of magnitude of the minimum firing voltage of the rectifier in said phase or less.

9. A controlled rectifier system comprising a plurality of rectifying phases each adapted to be supplied with current from an alternating current source, an electrical space discharge rectifier in each of said phases, control means for delaying the starting of current in each of said rectifiers for a substantial phase angle beyond the normal firing angle, a direct current load connected to the output of said rectifiers, an inductance in series with said load, said load having a predetermined normal maximum value of resistance, said inductance having a value in henries equal to or greater than $$L_c = \frac{R}{\omega} \left\{ \left(1 + \frac{D}{E_{dc}}\right) \left[ \tan\theta - \theta - \frac{\pi}{n} + \alpha + \frac{\pi \cos\left(\alpha + \frac{\pi}{2} - \frac{\pi}{n}\right)}{n \cos\theta \sin\frac{\pi}{n}} \right] \right\}$$

where $R$ = total normal maximum resistance of said load,
$\omega = 2\pi$ times the line frequency,
$D$ = voltage drop in the tubes,
$E_{dc}$ = direct current output voltage,
$\theta$ = said phase angle of firing delay,
$n$ = number of phases of rectification, $$\alpha = \frac{\pi}{n} - \frac{\pi}{2} + \sin^{-1}\left(\frac{n}{\pi} \cos\theta \sin\frac{\pi}{n}\right)$$

for values of $\theta$ between 0 and $$\tan^{-1}\left(\frac{n}{\pi} - \cot\frac{\pi}{n}\right) \text{ and}$$

$$L_c = \left\{ \frac{R}{\omega}\left(1 + \frac{D}{E_{dc}}\right)\left[\tan\theta\left(1 - \frac{\pi}{n}\cot\frac{\pi}{n}\right)\right] \right\}$$

for values of $\theta$ greater than $$\tan^{-1}\left[\frac{n}{\pi} - \cot\frac{\pi}{n}\right]$$

10. A controlled rectifier system comprising a plurality of rectifying phases each adapted to be supplied with current from an alternating current source, an electrical space discharge rectifier in each of said phases, control means for delaying the starting of current in each of said rectifiers for a substantial phase angle beyond the normal firing angle for controlling the magnitude of the voltage supplied to said load, a direct current load connected to the output of said rectifiers, the minimum value which the load voltage may be reduced by said control means being of the order of magnitude of the voltage drop through each rectifier during conduction of current or less, an inductance in series with said load, said load having a predetermined normal maximum value of resistance, said inductance having a value in henries equal to or greater than $$L_c = \frac{R}{\omega}\left\{\left(1 + \frac{D}{E_{dc}}\right)\left[\tan\theta - \theta - \frac{\pi}{n} + \alpha + \frac{\pi \cos\left(\alpha + \frac{\pi}{2} - \frac{\pi}{n}\right)}{n \cos\theta \sin\frac{\pi}{n}}\right]\right\}$$

where $R$ = total normal maximum resistance of said load,
$\omega = 2\pi$ times the line frequency,
$D$ = voltage drop in the tubes,
$E_{dc}$ = direct current output voltage,
$\theta$ = said phase angle of firing delay,
$n$ = number of phases of rectification, $$\alpha = \frac{\pi}{n} - \frac{\pi}{2} + \sin^{-1}\left(\frac{n}{\pi}\cos\theta\sin\frac{\pi}{n}\right)$$

for values of $\theta$ between 0 and $$\tan^{-1}\left(\frac{n}{\pi} - \cot\frac{\pi}{n}\right) \text{ and}$$

$$L_c = \frac{R}{\omega}\left\{\left(1 + \frac{D}{E_{dc}}\right)\left[\tan\theta\left(1 - \frac{\pi}{n}\cot\frac{\pi}{n}\right)\right]\right\}$$

for values of $\theta$ greater than $$\tan^{-1}\left[\frac{n}{\pi} - \cot\frac{\pi}{n}\right]$$

WILCOX P. OVERBECK.

Certificate of Correction

Patent No. 2,214,773. September 17, 1940.

WILCOX P. OVERBECK

It is hereby certified that errors appear in the printed specification of the above numbered patent requiring correction as follows: Page 1, first column, line 58, for "incoporating" read *incorporating;* and second column, line 59, for "codenser" read *condenser;* page 2, first column, line 66, in the equation, for "$E_{d_0}$" read $E_{d_0}$; page 3, first column, line 65, strike out the equation and insert instead the following—

$$\left[ \tan \theta - \theta - \frac{\pi}{n} + \alpha + \frac{\pi \cos\left(\alpha + \frac{\pi}{2} - \frac{\pi}{n}\right)}{n \cos \theta \sin \frac{\pi}{n}} \right];$$

page 6, first column, lines 28, 29, for that portion of the equation reading

"$L_c = \left\{ \frac{R}{\omega} \right.$"   read   $L_c = \frac{R}{\omega} \right\};$ and that the said Letters Patent should be read with these corrections therein that the same may conform to the record of the case in the Patent Office.

Signed and sealed this 29th day of October, A. D. 1940.

[SEAL]

HENRY VAN ARSDALE,

*Acting Commissioner of Patents.*